United States Patent
Hellman

(10) Patent No.: US 6,765,862 B1
(45) Date of Patent: Jul. 20, 2004

(54) TELECOMMUNICATION SWITCH, AND SWITCHING TELECOMMUNICATION SIGNALS

(75) Inventor: Esko Hellman, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/284,212

(22) PCT Filed: Oct. 7, 1997

(86) PCT No.: PCT/FI97/00608

§ 371 (c)(1),
(2), (4) Date: Apr. 8, 1999

(87) PCT Pub. No.: WO98/16082

PCT Pub. Date: Apr. 16, 1998

(30) Foreign Application Priority Data

Oct. 10, 1996 (FI) ................................................ 964065

(51) Int. Cl.⁷ .................................................. H04J 3/14
(52) U.S. Cl. ...................... 370/217; 370/221; 370/237; 370/395.2
(58) Field of Search ................................ 370/216–218, 370/241–242, 244, 395.2–395.72, 219–220, 225–228, 231, 222, 237, 223, 224, 249, 230

(56) References Cited

U.S. PATENT DOCUMENTS

| 4,254,498 | A |   | 3/1981  | Tawara et al. |          |
|-----------|---|---|---------|---------------|----------|
| 5,014,261 | A | * | 5/1991  | Shinbashi et al. | 370/220 |
| 5,166,926 | A | * | 11/1992 | Cisneros et al. | 370/392 |
| 5,235,599 | A | * | 8/1993  | Nishimura et al. | 340/2.23 |
| 5,436,886 | A |   | 7/1995  | McGill        |          |
| 5,471,460 | A | * | 11/1995 | Tanabe        | 370/218  |
| 5,485,453 | A |   | 1/1996  | Wahlman et al. |         |
| 5,732,085 | A | * | 3/1998  | Kim et al.    | 370/398  |

FOREIGN PATENT DOCUMENTS

| GB | 2 282 034   | 3/1995 |
| JP | 2-27855     | 1/1990 |
| WO | WO 97/33380 | 9/1997 |

* cited by examiner

*Primary Examiner*—Dang Ton
*Assistant Examiner*—Inder Pal Mehra
(74) *Attorney, Agent, or Firm*—Squire, Sanders & Dempsey L.L.P.

(57) ABSTRACT

The invention relates to an ATM telecommunication switch for switching telecommunication connections, said telecommunication switch comprising incoming lines, outgoing lines, and a switching field for switching any connection from an incoming line to a desired outgoing line, said switching field comprising inputs for supplying connections to said switching field, and outputs for supplying connections out of said switching field. The telecommunication switch of the invention is characterized in that it comprises a pre-selector provided between said incoming lines and said inputs for connecting a desired incoming one of said telecommunication switch to a desired input of the switching field.

14 Claims, 4 Drawing Sheets

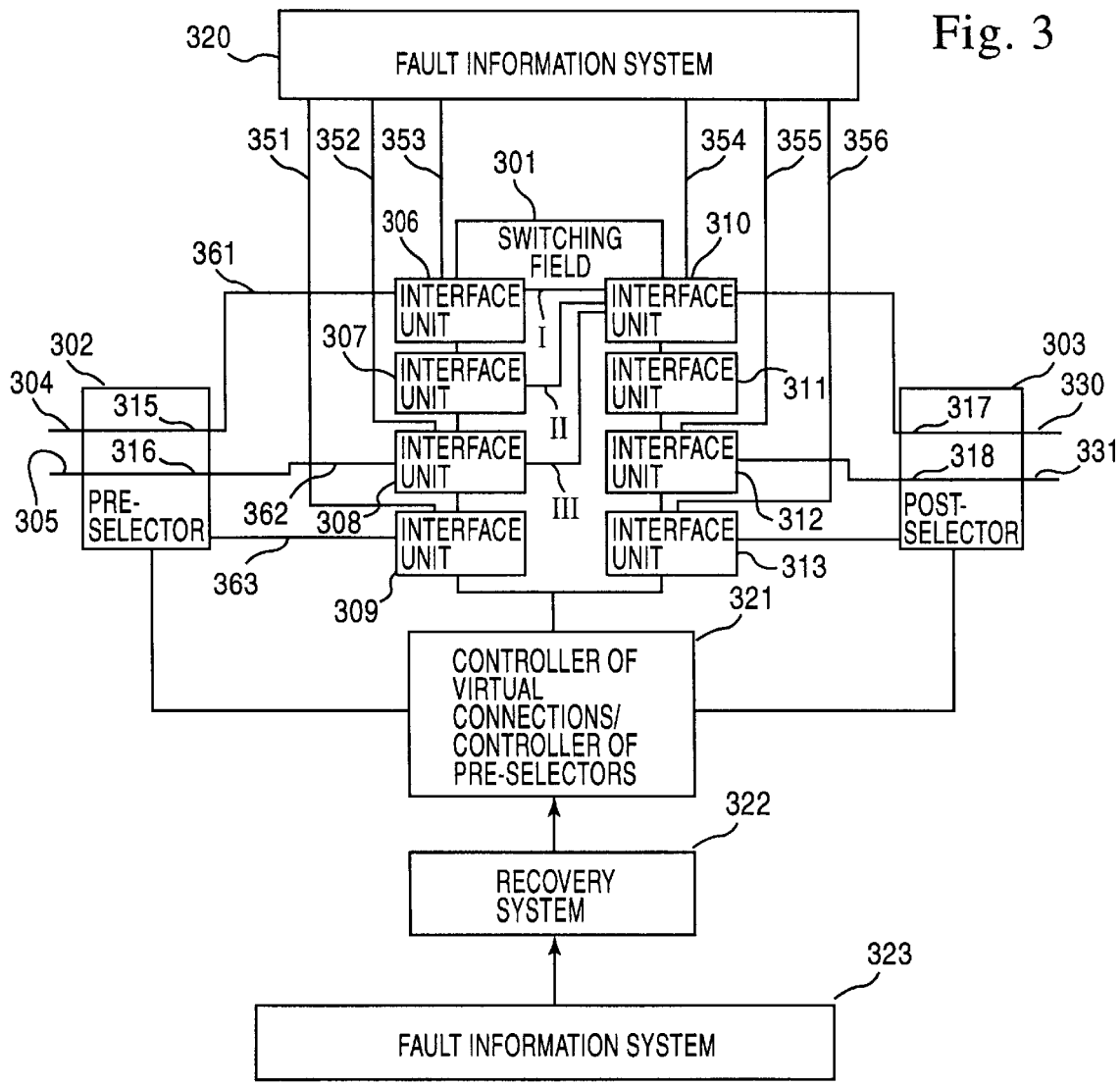

TELECOMMUNICATION SWITCH, AND SWITCHING TELECOMMUNICATION SIGNALS

This application is based on Finnish Patent Application No. 964065, filed in Finland on Oct. 10, 1996, the content of which is incorporated hereinto by reference.

FIELD OF THE INVENTION

The invention relates to an ATM telecommunication switch for switching telecommunication connections, said telecommunication switch comprising incoming lines, outgoing lines, and a switching field for switching any connection from an incoming line to a desired outgoing line, said switching field comprising inputs for supplying connections to said switching field, and outputs for supplying connections out of said switching field.

BACKGROUND OF THE INVENTION

ATM telecommunication switches typically employ ATM switching fields (ATM=Asynchronous Transfer Mode). In these fields, ATM cells, or packets containing data, are switched from one connection to another in such a way that the connections remain unbroken, extending from an originator to a desired receiver. A characteristic of the switching fields is that they are susceptible to faults; a fault may affect either the entire switching field or only a part of it. A conventional and natural way of improving the reliability of ATM telecommunication switches is to duplicate the switching field of the switch. ATM switching fields are, however, expensive, wherefore it is extremely expensive to ensure their reliability by duplication. In addition, the aim is that all the connections switched through the switching field, e.g. virtual connections, have the same probability of succeeding. It is thus necessary to duplicate the entire switching field for reasons of reliability. The switching field is an essential part of an ATM telecommunication system, and the succeeding probability of the switchings performed in it, i.e. the service level, is to be kept even for all connections to be switched. It is obvious, however, that there may be connections with a lower service level and connections with a higher service level, i.e. connections based on duplicated switching, but this results in different service classes for connections. Usually a fault affects only one line of the switching field, and not the entire field. It is therefore useful to implement an ATM telecommunication switch in such a way that a fault occurring in a certain part, e.g. in one or more lines, of a switching field does not prevent the entire switch from operating.

BRIEF DESCRIPTION OF THE INVENTION

An object of the present invention is to provide a solution to the problem with the prior art, i.e. how to cope with a fault occurring in an ATM switching field, particularly in a part of it. The object is to provide an ATM telecommunication switch and a method for using it in such a way that a fault occurring in a certain part of the switching field does not prevent the entire switch from operating.

This new type of ATM telecommunication switch is characterized by comprising a pre-selector provided between said incoming lines and said inputs for connecting a desired incoming line of said telecommunication switch to a desired input of the switching field.

The invention further relates to a method for switching telecommunication connections in an ATM switch comprising incoming lines, outgoing lines, and a switching field for switching any connection from an incoming line to a desired outgoing line, said switching field comprising inputs for supplying connections to said switching field, and outputs for supplying connections out of said switching field.

The method of the invention is characterized by providing said telecommunication switch with a pre-selector between said incoming lines and said inputs for switching a desired incoming line of said telecommunication switch to a desired input of the switching field.

The invention is based on the idea that an ATM switch is provided either with a pre-selector before or after the switching field or with a post-selector after the switching field. A pre-selector allows a desired incoming line of the switch to be connected to the desired input of the switching field. Correspondingly, a post-selector allows a desired output of the switching field to be connected to the desired outgoing line. A pre-selector preferably comprises at least one input connected to the incoming line of the entire switch, and a plurality of outputs connected to the inputs of the switching field. By means of these inputs, the line to be connected by the pre-selector can be guided to an operational input of the switching field. It should be noted that the term 'pre-selector' is used herein to refer mainly to a pre-selector or a post-selector provided after the switching field.

Another feature of the invention is that the interfaces between the pre-selector and the ATM switching field comprise at least two interfaces towards the field per each incoming line of the pre-selector in the telecommunication switch.

An advantage of the ATM telecommunication switch and the corresponding method of the invention is that they render it unnecessary to duplicate the switching field of an ATM telecommunication switch; sufficient reliability of the switching field is ensured by the use of a pre-selector of the invention. This saves costs essentially, for it is very expensive to duplicate the entire switching field.

BRIEF DESCRIPTION OF THE DRAWINGS

In the following, the invention will be described in greater detail with reference to the accompanying drawings, in which FIG. 3 shows an ATM telecommunication switch of an embodiment of the invention in a normal situation.

DETAILED DESCRIPTION OF THE INVENTION

Figure 1:
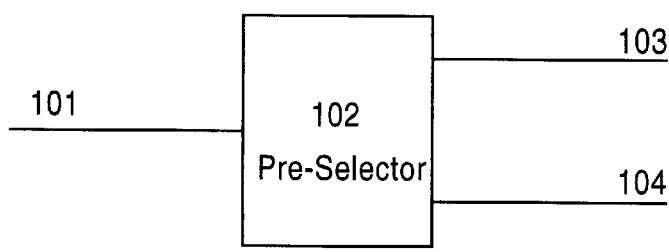
FIG. 1 shows a pre-selector of a first embodiment of the invention.

FIG. 1 shows a pre-selector 102 of a first embodiment of the invention. The pre-selector 102 is provided before a switching field in an ATM switch. By means of the preselector 102, a desired incoming line 101 of the telecommunication switch can be connected to the desired input of the switching field. The pre-selector comprises preferably at least one input 101 connected to the incoming line of the entire switch, and a plurality of outputs 103, 104 connected to the inputs of the switching field. FIG. 1 shows two outputs of the pre-selector, connected to the inputs of the switching field. A pre-selector may naturally comprise a much larger number of outputs than two. Furthermore, the pre-selector may also be provided after the switching field.

Figure 2:
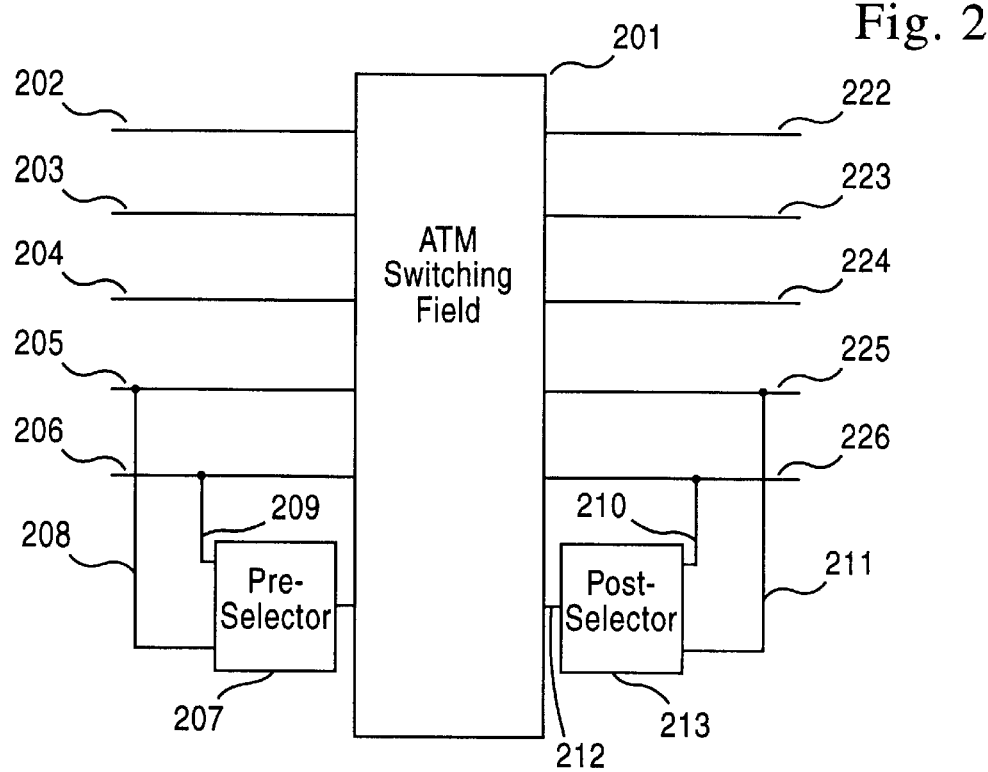
FIG. 2 shows a switch of a second embodiment of the invention, provided with pre- and post-selectors.

FIG. 2 shows a switch of a second embodiment of the invention, provided with pre- and post-selectors. FIG. 2 shows incoming lines 202 to 206 of the switch for supplying incoming signals to the ATM switching field 201. Instead of being connected directly to the switching field, some of the incoming lines 205, 206 are connected 208, 209 to a pre-selector 207, which selects which one of these incoming lines 205, 206 is connected redundantly further to the ATM switching field 201. A post-selector 213 is connected to the switching field 201 through an outgoing line 212. In the post-selector 213, the signal from the outgoing line 212 is supplied to either of two output branches 210 and 211, from which the signal is supplied to the desired output 225 or 226 of the switching field 201.

The operating principle of the solution illustrated in FIG. 2 is as follows. After the ATM line has been changed, the control of the equipment updates the switchings of the connections to correspond to the new situation. Thus, when a fault occurs at a switching node between input 205 and output 226 of the switching field 201, for example, the signal propagating between them can be guided to a trunk line 208 (input 206 correspondingly to trunk line 209), from which it is supplied to the pre-selector 207 and further to the switching field 201. From the switching field, the signal is supplied to output 212 and further to a post-selector 213, from which it is supplied to either of outputs 210 and 211 and further to the outputs of the switch.

FIG. 3 shows an ATM telecommunication switch of an embodiment of the invention in a normal situation. The switch comprises a switching field 301 with interface units 306 to 313. The switch of the invention further comprises a pre-selector 302 connected before it between incoming lines 304 and 305 and interface units 306 and 308 of the switch. A post-selector 303 is correspondingly provided between interface units 310 and 312 of the switch 301 and outgoing lines 330 and 331 of the switch. The operation and faults of the interface units of the switch are controlled by a fault information system 320, from which there are connections 351 to 356 to the above-mentioned interface units 306 to 313 of the switch. A control unit 321 is connected to the pre-selectors for controlling the pre-selectors, the switching of connections, and also the actual switching field 301. The control unit 321 is controlled by a recovery system 322, which makes it possible to perform necessary recovery procedures. The recovery system, in turn, is controlled by a fault information system 323, in which statistical data are stored on the faults that have occurred in the switch.

FIG. 3 shows a situation where two ATM lines 361, 362 are secured in the manner of the invention, i.e. their incoming and outgoing lines connected to the ATM field are connected through the pre-selector 302 and correspondingly through the post-selector 303. A redundant ATM line 363 is also connected to the pre-selector 302, but it is not connected through the preselector, nor has it any other connections in the ATM field. The ATM field operates normally, and in the case of FIG. 3, three connections I, II and III, all of which are connected from the interface units 306 to 308 of the switch to interface unit 310, are switched to one of the secured ATM lines in the outgoing direction.

As the switch is operating, the fault information system 320 monitors the condition of the interfaces 306 to 313 of the ATM field and is ready to report on any faults to the recovery system 322. Between the fault information system 320 and the recovery system 322 there is a telecommunication connection, which is not shown in the figure. If necessary, the recovery system 322 can command the system controlling the ATM field 301 to change the switching points and the connections of the pre-selectors in such a way that the effect of any faults or malfunctions can be prevented, and the connections to be switched through the switch remain unbroken.

Figure 4:
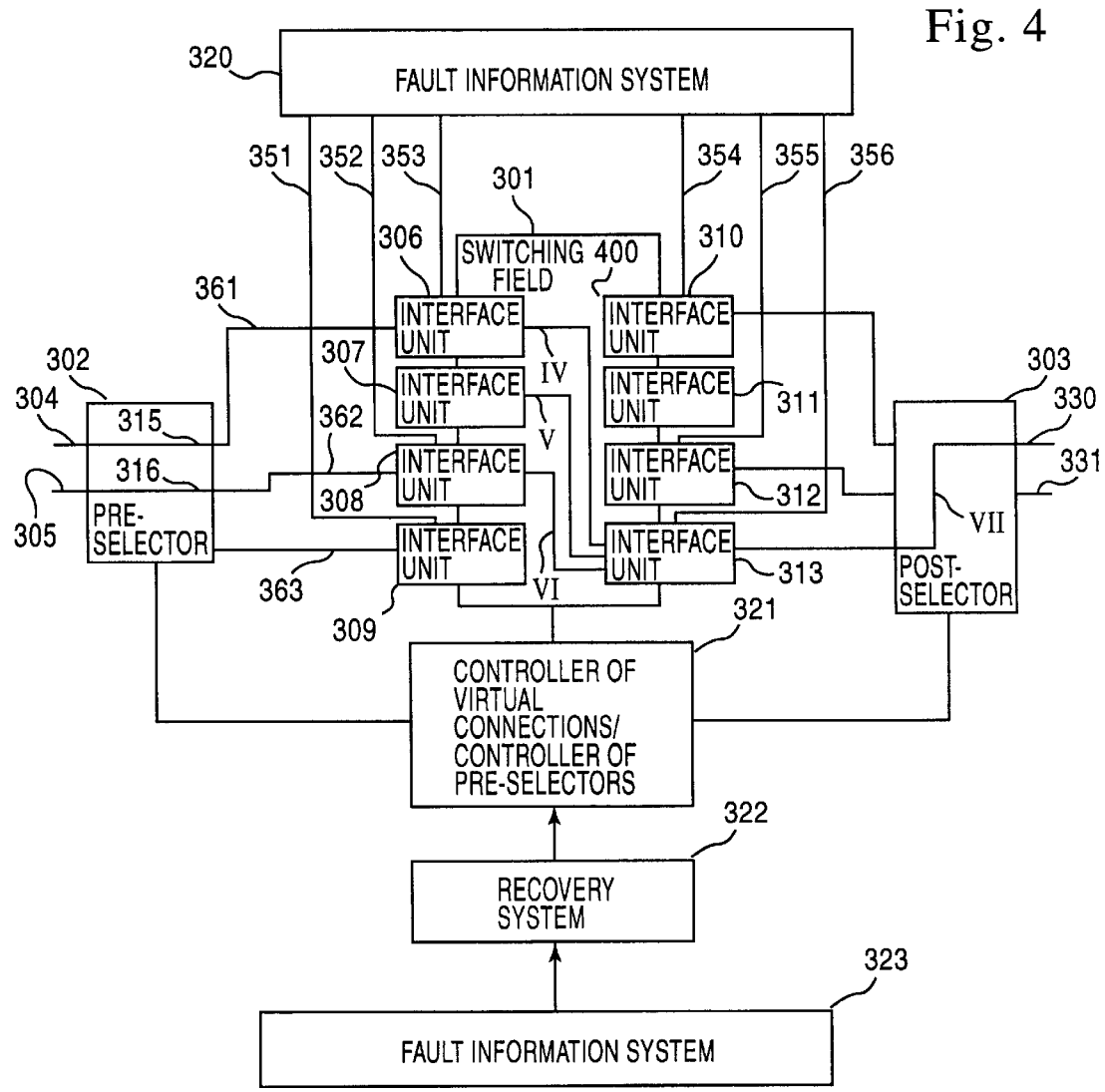
FIG. 4 shows an ATM telecommunication switch of an embodiment of the invention in a situation where a fault that has occurred has been corrected.

FIG. 4 shows an ATM telecommunication switch according to an embodiment of the invention in a situation where a fault that has occurred has been corrected. The illustrated structural components of the switch are the same as in FIG. 3, in connection with which their structure and operation have been described. In the case of FIG. 4, the fault information system 320 detects a fault 400 in the interface 310 of the outgoing line of the ATM switching field 301 of a secured ATM line, and informs the recovery system 322 of the fault. The recovery system 322 commands the controller 321 of the pre-selectors to instruct the post-selector 303 to switch out redundant line VII, instead of the line (interface 310) where the fault is. In addition, the recovery system 322 commands the controller 321 of the switching field 301 to release the connections I, II and III connected to the line where the fault is; these connections, when still unbroken, are shown in FIG. 3. The recovery system also commands the switching field to switch the desired connections to a redundant interface 313, from which they are forwarded to the redundant line. From the redundant line, the connection is supplied to the post-selector 303, where the connection is switched through the post-selector to the outgoing line 330 of the switch. In this embodiment, connections I, II and III of FIG. 3 are thus guided by the pre-selector back to the desired line, i.e. to the one to which the switching field would normally have switched them.

An alternative way would be to switch the redundant line and its interfaces 309, 313 to use even in the incoming direction of the switch by means of the pre-selector 302, even if the incoming line were operational. The advantage of this would be that the incoming and outgoing lines would be of the same line. In this case, the connections of the line that has the fault 400, i.e. interface 310, in the incoming direction should also be switched to the redundant line, i.e. interface 313. The drawback of this arrangement is losing the possibility of using the redundant pre-selector 302 of the incoming direction for instance if a fault occurs in one of the secured lines in the incoming direction.

Figure 5:
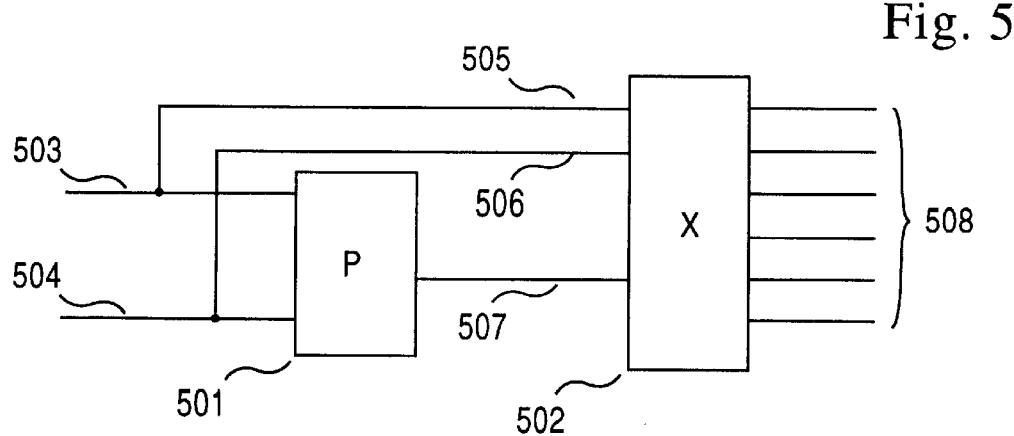
FIG. 5 shows an embodiment of the invention where a pre-selector is provided in the incoming direction of the switching field.

FIG. 5 illustrates an embodiment of the invention, in which a pre-selector P, 501 is provided in the incoming direction of the switching filed. The figure shows the preselector P, 501 and a redundant line 507 leading therefrom to the switching field 502. In this embodiment, the switching field 502 performs the actual switching. Incoming lines 503 and 504 lead to the switch. In this embodiment, separate trunk lines 505 and 506 lead from the incoming lines directly to the switching field 502. When a fault occurs in either one of these direct trunk lines or their interface units in the switching field (see FIGS. 3 and 4), a connection of either one of the incoming lines 503 and 504 can be switched through the pre-selector P 501 to a redundant line 507 and further through the redundant interface units and switching nodes provided in the switching field to the desired outgoing line 508. Thus, only when necessary, the desired incoming line 503, 504 is switched through the pre-selector 501 P to the redundant interface provided in the switching field 502 X.

The advantage of this embodiment is that the reliability of the pre-selector becomes less important, since the connections to be switched pass the pre-selector during normal operation. Only exceptionally, i.e. in the event of a fault, the connections to be switched pass through the pre-selector 501, whereby the pre-selector makes it possible to recover from the fault.

Figure 6:
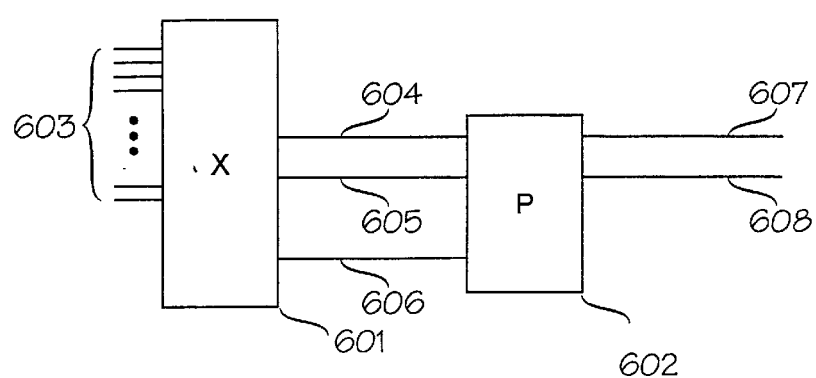
FIG. 6 shows an embodiment of the invention where a pre-selector is provided in the outgoing direction of the switching field.

FIG. 6 illustrates an embodiment of the invention where a pre-selector 602 is provided in the outgoing direction of the switching field 601 as a post-selector. FIG. 6 shows a switching field X 601, to which the incoming lines 603 of the switch lead. At least normal lines 604, 605 and a redundant line 606 lead from the switching field to the post-selector 602, P. Outgoing lines 607, 608 of the switch lead out of the post-selector. In this embodiment, if a fault occurs in one of the normal lines 604, 605 or the corresponding interfaces of the switching field (correspond to interfaces of FIG. 3), or at a switching node performing a switching from the switching field to this connection, the connection is routed in such a way that it passes from the switching field 601 through the redundant line 606 to the post-selector 602. The post-selector 602 operates in such a manner that a connection which was originally intended for outgoing line 607 and arrives at the post-selector from the redundant line is switched to that outgoing line 607, and correspondingly, a connection originally intended for outgoing line 608 is switched to that outgoing line 608. This embodiment can naturally also be implemented as a mirror image such that the pre-selector is connected (before the switching field X) directly to the incoming lines of the switch, and the switching field immediately between the pre-selector and the outgoing lines of the switch. The operation of this embodiment corresponds to that of the embodiment of FIG. 6 except that the functional components are in reverse positions.

Figure 7:
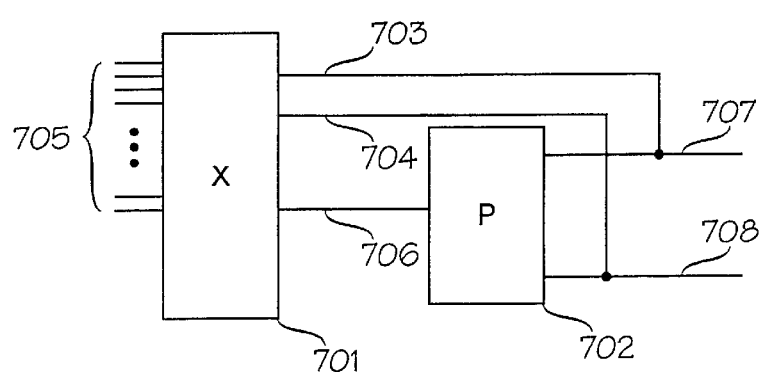
FIG. 7 shows an embodiment of the invention where some of the outputs of the switching field are connected to the outputs of a pre-selector provided in the outgoing direction of the switching field.

FIG. 7 shows an embodiment of the invention where some of the outputs of the switching field X are connected to the outputs of the pre-selector provided in the outgoing direction of the switching field 701, X. In the embodiment illustrated, incoming lines 705 are connected to the switching field X, 701, from which a redundant line 706 leads to a post-selector P, 702, the outputs of which are connected to outgoing lines 707 and 708 of the switch. From the switching field, normal connections are connected as lines 703 and 704 directly to the outgoing lines 707 and 708 of the switch.

In this embodiment, if a fault occurs in the outgoing lines 703, 704, or in their interfaces or switching nodes of the switching field, the connection to be switched can be guided to pass through the redundant line 706 to the post-selector 702, P. By means of the post-selector, the connection to be switched can be switched to either one of the outgoing lines of the switch. A switch may naturally comprise several pre- or post-selectors.

The pre- and post-selectors do not, of course, have to be connected in the same way on both the input side and the output side. It is also possible that a selector is used only on one side. Alternatively, the traffic may be bidirectional, and the connection is assigned both an incoming and an outgoing line.

Figure 8:
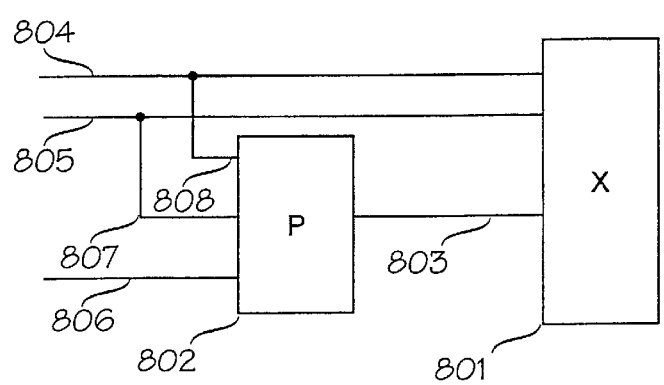
FIGS. 8 and 9 illustrate the use of priorities in connecting incoming lines of the pre-selector to a redundant connection.

FIG. 8 illustrates the use of priorities for switching incoming lines of the pre-selector to a redundant connection. The figure shows a switching field 801, X, to which a pre-selector 802, P is connected by means of a redundant line 803. In addition to the redundant line 803, incoming lines 804, 805, 806 lead to the switch. Incoming lines 804 and 805 are connected directly to the switching field 801 and further to the pre-selector 802, P through auxiliary connections 807 and 808.

In this embodiment, the redundant line 803 forms a redundant connection for incoming lines 804 and 805, if a fault occurs in one or both of their inputs to the switching field 801. When both of the incoming lines 804, 805 of the switching field 801 are operational, the traffic of line 806 is normally carried through the pre-selector 802, P to the redundant line 803 and further to the switching field 801. Incoming line 806 thus uses the redundant connection 803 positioned after the pre-selector for establishing a connection to the switching field 801 when both the incoming lines 804 and 805 are operational and do not need the redundant line 803. Incoming line 806 has thus a lower priority in relation to incoming lines 804 and 805, but incoming line 806 utilizes the redundant line 803 when the incoming lines 804 and 805 with a higher priority do not need the redundant line.

Figure 9:
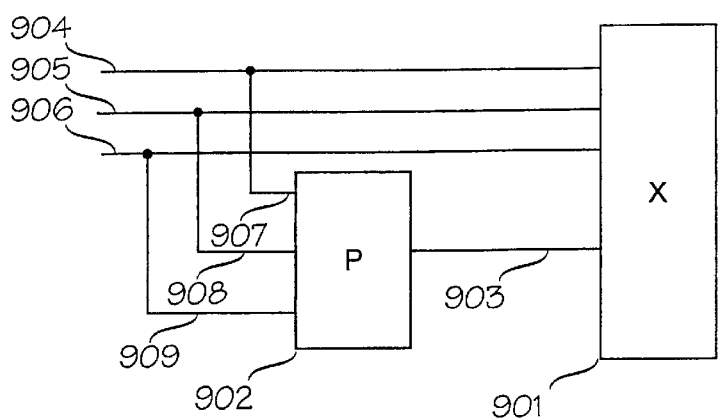

FIG. 9 illustrates the use of priorities for connecting incoming lines of a pre-selector to a redundant connection. The figure shows a switching field 901, X, to which a pre-selector 902, P is connected by means of a redundant line 903. In addition to the redundant line 903, incoming lines 904, 905 and 906 lead to the switch. Incoming lines 904, 905 and 906 are connected directly to the switching field 901. Incoming lines 904, 905 and 906 are further connected through auxiliary connections 907, 908 and 909 to the pre-selector 902, P.

In this embodiment, the redundant line 903 forms a redundant connection for all the incoming lines 904, 905 and 906, if a fault occurs in one or all of them or their inputs to the switching field 901, X. When all the incoming lines 904, 905, 906 of the switching field 901 are operational, the connections pass directly from the incoming lines 904, 905, 906 to the switching field 901, X. The incoming lines 904, 905 and 906 may have mutual priorities regarding which connection has the right to use the redundant line if a fault occurs in some or all of the lines 904, 905, 906 or the corresponding interfaces of the switching field 901. This applies thus to a situation where a fault occurs in more than one lines, since when a fault occurs in only one connection, the redundant line 903 is allocated to the connection where the fault is.

The drawings and the description relating to them are intended merely to illustrate the inventive concept. In its details, the ATM telecommunication switch of the invention and the method for switching telecommunication signals in an ATM telecommunication switch may vary within the scope of the appended claims. Although the invention has been described above mainly with reference to ATM switching, the invention may also be used in other kind of telecommunication switching.

If desired, the pre-selectors can be combined into one apparatus comprising a large number of input ports and a desired number of output ports. There must be at least one redundant line, but there may also be a plurality of redundant lines. The secured lines may be selected fixedly.

The number of lines to be secured has not been defined in the present invention. It would also be possible to talk about lines to be secured per a redundant line, or input/output lines to be secured per an interface of a redundant line. The quality and coverage of the redundancy (securing) are naturally also dependent on this ratio.

It will also be obvious that the line to be secured should be important in a certain respect as compared with the lines that are not secured, unless all the lines of the switch are secured by a pre-selector. Such a line secured by a pre-selector could carry important connections, e.g. connections used by network management or connections particularly important to subscribers. A trunk line between nodes is typically also more important than an individual subscriber line.

What is claimed is:

1. An ATM telecommunication switch, for switching telecommunication connections, the telecommunication switch comprising:

incoming lines;

outgoing lines; and a switching field for switching any connection from an incoming line to a desired outgoing line, the switching field including:

inputs for supplying connections to the switching field;

outputs for supplying connections out of the switching field; and a pre-selector provided between the incoming lines and inputs for selecting and connecting a desired incoming line of the telecommunication switch to a desired input of the switching field, said pre-selector being positioned outside of the switching field;

wherein the pre-selector is arranged, when a fault occurs in a route connected to the output of the pre-selector, to connect a line of the route where the fault occurs to an alternative output therein, if the output of the pre-selector is redundant and idle, or if the line connected to it has a lower priority than incoming line of the route where the fault occurs.

2. The ATM telecommunication switch according to claim 1, wherein the pre-selector is arranged to connect an incoming line of the switch through a switch input to one of several inputs of the switching field.

3. The ATM telecommunication switch according to claim 1, wherein the pre-selector comprises an input connected to an incoming line and a plurality of outputs connected to the inputs.

4. The ATM telecommunication switch according to claim 3, wherein the pre-selector comprises one input connected to the incoming line and two outputs connected to the inputs.

5. The ATM telecommunication switch according to claim 3, wherein the pre-selector is arranged to connect the incoming line through an incoming line input to two alternative outputs connected to the inputs such that the incoming line can be connected through the pre-selector to a redundant input of the switching field.

6. The ATM telecommunication switch according to claim 3, arranged to switch connections to be established responsive to changes in use of a switching means such that the connections pass unbroken through the switching means.

7. The ATM telecommunication switch according to claim 6, comprising a control unit responsive to the switching means, the control unit being arranged to control the switching means wherein the connections pass unbroken through the switching means.

8. The ATM telecommunication switch according to claim 6, arranged to switch the connections to be established responsive to changes in use of the switching means such that the connections to be established will be unbroken although a fault has occurred in some switchings of the switching means, whereby the connections have been released.

9. The ATM telecommunication switch according to claim 1, wherein the pre-selector comprises a plurality of inputs, and a plurality of outputs.

10. The ATM telecommunication switch according to claim 1, further comprising a plurality of pre-selectors connected between the incoming lines and the inputs.

11. A method for switching telecommunication connections in an ATM switch including:

incoming lines;

outgoing lines; and a switching field for switching any connection from an incoming line to a desired outgoing line, the switching field including:

inputs for supplying connections to the switching field; and outputs for supplying connections out of the switching field;

the method comprising:

providing the telecommunication switch with a pre-selector between the incoming lines and the inputs and positioned outside of the switching field, the pre-selector for selecting and switching a desired incoming line of the telecommunication switch to a desired input of the switching field;

detecting a fault in a route connected to an output of the pre-selector;

responsive to the fault occurring in the route connected to the output of the pre-selector, connecting the incoming line of the pre-selector instead of a corresponding actual output to another output of the pre-selector, if the another output is connected to a redundant and idle input of the switching field, or a line using the another output has a lower priority than the incoming line of the route where the fault occurs.

12. The method according to claim 11, wherein switching comprises switching a line connected to an input of the pre-selector to one of an actual input and a redundant input.

13. The method according to claim 11, further comprising controlling shared use of the pre-selector and switching field wherein connections remain unbroken.

14. The method according to claim 13, further comprising controlling shared use of the pre-selector and switching field wherein connections remain unbroken although a fault has occurred in some switchings of the switching field, whereby the connections through faulty switchings have become impossible.

* * * * *